United States Patent Office 2,778,080
Patented Jan. 22, 1957

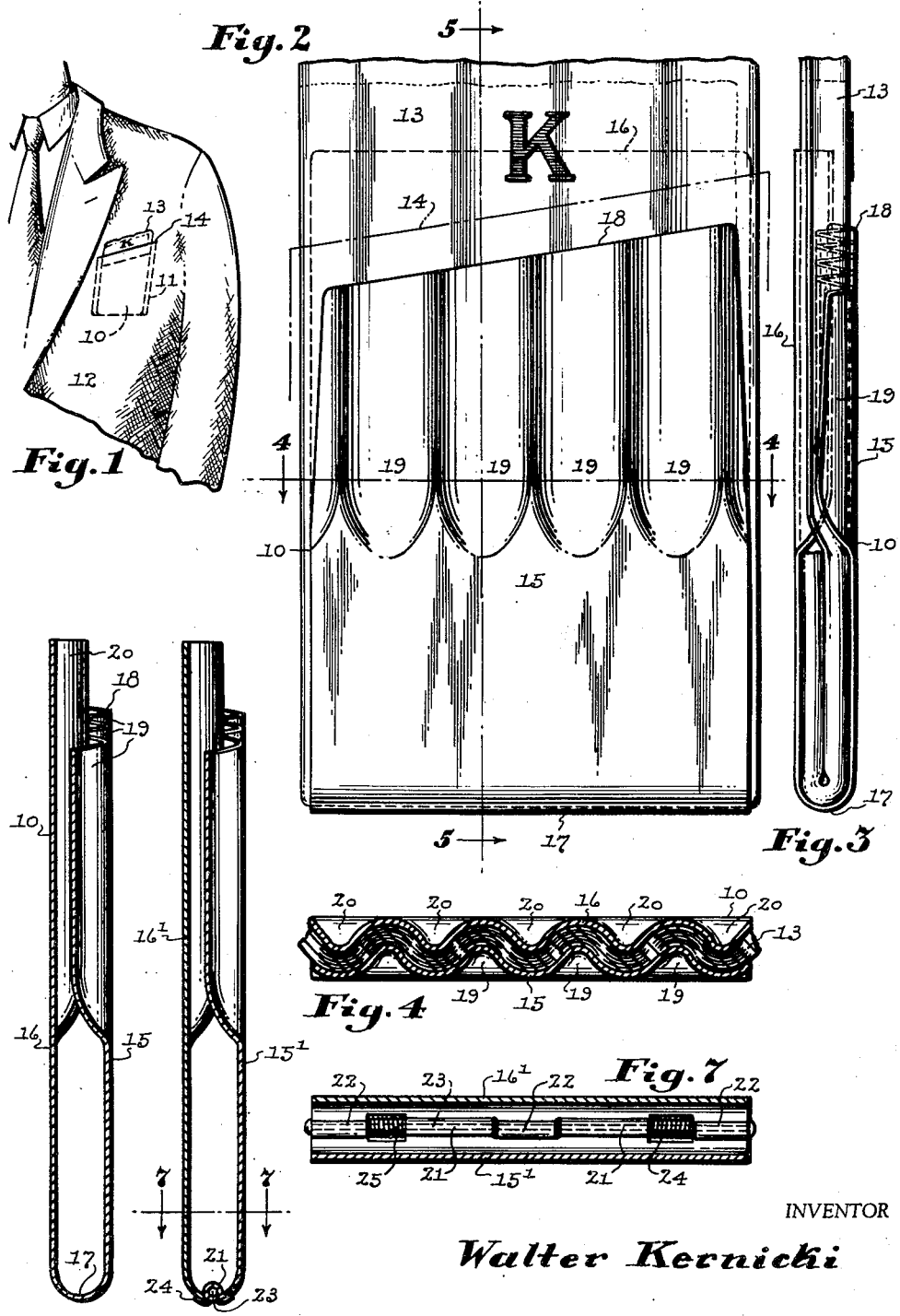

2,778,080

HANDKERCHIEF HOLDER

Walter Kernicki, Grand Rapids, Mich.

Application June 29, 1953, Serial No. 364,586

1 Claim. (Cl. 24—3)

The present invention relates to a handkerchief holder.

The primary objects of the invention are to provide a device which is adapted to hold a handkerchief in a neat and attractive condition in the lapel pocket of the user; to provide such a device into which a flat-folded handkerchief may quickly and easily be inserted and the device then readily placed in the lapel pocket so as to conceal the device while at the same time displaying the upper portions of the handkerchief projecting out of the pocket in a unique and attractive manner; to provide such a device which with the handkerchief inserted therein will be maintained in a relatively fixed position so that the handkerchief is handsomely displayed at all times until the user removes the device from the pocket; and to provide such a device which in itself is attractive in appearance and reasonably economical in manufacture.

Illustrative embodiments of the invention are shown in the accompanying drawings, wherein:

Figure 1 is a fragmentary view of a suit coat having a lapel pocket in which is disposed the new handkerchief holder;

Figure 2 is a front elevational view of the holder with a handkerchief inserted therein;

Figure 3 is a side elevational view of the same;

Figure 4 is a horizontal sectional view of the same taken on line 4—4 of Figure 2;

Figure 5 is a vertical sectional view of the handkerchief holder per se taken on line 5—5 of Figure 2;

Figure 6 is a vertical sectional view similar to Figure 5 but showing a slightly modified form of the holder; and Figure 7 is a horizontal sectional view of said modified form of holder taken on line 7—7 of Figure 6.

Referring now in detail to these drawings, the handkerchief holder there shown is generally designated 10 and is illustrated in dotted lines in Figure 1 inserted in the lapel pocket 11 of a man's suit coat 12, and a handkerchief 13 inserted in and held by the holder 10 projects from the pocket's upper opening 14 shown in Figure 1 and indicated by a broken line in Figure 2.

As illustrated in Figures 2 through 5, the new holder comprises a front leaf 15 and a back leaf 16 integrally connected at their lower edges by a bight 17. The material of the holder is preferably plastic but may be of sheet metal, heavy cardboard, or any other suitable material. In any case the material is preferably slightly flexible so that the upper portions of the leaves 15, 16 may be slightly sprung apart to receive the flat-folded handkerchief 13 therebetween, the springable bight 17 of the device thus serving as a "hinge connection" between the front leaf 15 and the back leaf 16.

The front leaf 15 is of somewhat lesser height than the back leaf 16 and as shown the upper edge 18 of the front leaf is sloped to conform to the slope of the opening of a typical lapel pocket. The upper portions of the two leaves of the device are oppositely fluted, the flutings 19 of the front leaf 15 nesting with the flutings 20 of the back leaf 16, as best seen in Figure 4.

It will be seen that when the handkerchief 13 is folded as indicated in Figures 2 and 3 and inserted and pressed between the leaves 15 and 16 of the holder, the upper part of the handkerchief has imparted thereto a fluted condition conforming generally to the nested flutings of the leaves. When the holder 10 and the handkerchief 13 held thereby are inserted in the lapel pocket of the user, the front leaf 15 of the device is concealed within the pocket, the fluted upper portion of the handkerchief projects out of the pocket in a unique and attractive manner, while the back leaf 16 of the device is concealed within the pocket and behind the upper portion of the handkerchief. Specially monogrammed handkerchiefs may effectively be used with the holder, as illustrated.

In the modification of the invention illustrated in Figures 6 and 7, the front leaf 15¹ and back leaf 16¹ are not integrally formed but are separate elements having their lower ends notched and curled to form hinge bearings 21, 22 respectively through which extends a hinge pin 23 to thus form the hinge connection between the two leaves. Spring elements 24, 25 circumscribing the hinge pin 23 are arranged so as to press the leaves 15¹ and 16¹ together thus providing a more positive pressing action on a handkerchief inserted between the leaves.

It will thus be seen that the invention provides an attractive device whereby a handkerchief may conveniently be inserted in or removed from the user's lapel pocket, and whereby the handkerchief is attractively displayed and maintained in relatively fixed position at all times until removed by the user.

While but two specific embodiments of the invention have been herein shown and described, it will be understood that details thereof may be altered or omitted without departing from the spirit of the invention as the same is defined by the following claim.

I claim:

A handkerchief holder comprising a front leaf and a back leaf each of substantially rectangular shape, means connecting said leaves together at their lower edges, said leaves being adapted to engage a flat-folded handkerchief over substantially all of the front and back surfaces except for the upper front portion thereof, said connecting means including means for urging said leaves together to compress said handkerchief therebetween, said front leaf being of lesser height than said back leaf, said holder being adapted for insertion into a lapel pocket with the front leaf concealed within the pocket, with the handkerchief projecting out of the pocket, and with the upper part of the back leaf concealed behind the upper edges of the folded handkerchief, and substantial upper portion of each of said leaves being vertically fluted, the flutings of the front leaf nesting with the flutings of the back leaf to effect a fluted condition in the upper marginal edges of the folded handkerchief engaged between said leaves.

References Cited in the file of this patent

UNITED STATES PATENTS

| | | |
|---|---|---|
| 387,611 | Winnek | Aug. 7, 1888 |
| 497,638 | Diefenbach | May 16, 1893 |
| 976,437 | Crosby | Nov. 22, 1910 |
| 1,213,644 | Holcomb | Jan. 23, 1917 |
| 1,516,661 | Bechtold | Nov. 25, 1924 |